United States Patent [19]

Stanford

[11] Patent Number: 4,869,733

[45] Date of Patent: Sep. 26, 1989

[54] SUPER-ENRICHED OXYGEN GENERATOR

[75] Inventor: Raymond A. Stanford, Rock Island, Ill.

[73] Assignee: VBM Corporation, Louisville, Ky.

[21] Appl. No.: 211,424

[22] Filed: Jun. 24, 1988

Related U.S. Application Data

[63] Continuation of Ser. No. 31,541, Mar. 30, 1987, abandoned, which is a continuation-in-part of Ser. No. 865,869, May 22, 1986, Pat. No. 4,673,415.

[51] Int. Cl.$^4$ ............................................. B01D 53/04
[52] U.S. Cl. ............................................ 55/21; 55/68; 55/179; 55/218; 55/389
[58] Field of Search ................. 55/18, 21, 25, 26, 31, 55/33, 35, 58, 62, 66, 68, 74, 75, 161–163, 179, 387, 389

[56] References Cited

U.S. PATENT DOCUMENTS

| | | | |
|---|---|---|---|
| 3,155,468 | 11/1964 | deMontgareuil et al. | 55/75 X |
| 3,242,645 | 3/1966 | deMontgareuil et al. | 55/68 X |
| 3,252,268 | 5/1966 | Stark | 55/25 |
| 3,282,028 | 11/1966 | Berlin | 55/66 X |
| 3,313,091 | 4/1967 | Berlin | 55/58 |
| 3,338,030 | 8/1967 | Feldbauer, Jr. | 55/25 |
| 3,838,553 | 10/1974 | Doherty | 55/58 |
| 3,923,477 | 12/1975 | Armond et al. | 55/25 |
| 3,957,463 | 5/1976 | Drissel et al. | 55/25 |
| 3,977,845 | 8/1976 | Walter | 55/25 |
| 3,996,028 | 12/1976 | Golovko et al. | 55/66 X |
| 4,013,429 | 3/1977 | Sircar | 55/33 |
| 4,190,424 | 2/1980 | Armond et al. | 55/58 |
| 4,194,890 | 3/1980 | McCombs et al. | 55/18 |
| 4,239,509 | 12/1980 | Bligh et al. | 55/66 |
| 4,264,340 | 4/1981 | Sircar et al. | 55/25 |
| 4,386,945 | 6/1983 | Gardner | 55/26 |
| 4,477,265 | 10/1984 | Kumar et al. | 55/26 |
| 4,519,813 | 5/1985 | Hagiwara et al. | 55/26 |
| 4,529,412 | 7/1985 | Hayashi et al. | 55/25 |
| 4,552,571 | 11/1985 | Dechene | 55/179 X |
| 4,566,881 | 1/1986 | Richter et al. | 55/25 |
| 4,584,001 | 4/1986 | Dechene | 55/179 X |
| 4,636,226 | 1/1987 | Canfora | 55/179 X |
| 4,661,125 | 4/1987 | Haruna et al. | 55/26 |
| 4,673,415 | 6/1987 | Stanford | 55/179 X |

*Primary Examiner*—Robert Spitzer
*Attorney, Agent, or Firm*—Fay, Sharpe, Beall, Fagan, Minnich & McKee

[57] ABSTRACT

A cross over valve (46) cyclically supplies air from a compressor (30) to a first bed (48). The first bed contains a material, such as a 5 angstrom zeolite, which preferentially adsorbs nitrogen and passes oxygen and argon therethrough. The oxygen and argon mixture is passed to an oxygen/argon receiving reservoir (60). As the cross over valve flushes nitrogen from the first bed, a pumping fluid under pressure is fed into a pressurizing fluid receiving region (66) to pump the oxygen/argon mixture into a second bed (80). The second bed contains a material, such as 4 angstrom zeolite, which passes nitrogen and argon therethrough and which preferentially adsorbs oxygen. The argon, and the nitrogen if any, are discharged through a secondary gas outlet (22) and the oxygen is adsorbed. The adsorbed oxygen is drawn from the second bed by an enriched oxygen pump (90) and pumped periodically into an enriched oxygen storage reservoir (100).

14 Claims, 2 Drawing Sheets

SUPER-ENRICHED OXYGEN GENERATOR

This application is a continuation of application Ser. No. 031,541, filed March 30, 1987 now abandoned which, in turn is a continuation-in-part of application Ser. No. 865,869, filed May 22, 1986, now U.S. Pat. No. 4,673,415.

BACKGROUND OF THE INVENTION

This application is a continuation of U.S. patent application Ser. No. 865,869, filed May 22, 1986.

The present invention relates to the art of gas separation. It finds particular application in the separation of substantially pure oxygen gas from atmospheric air and will be described with particular reference thereto. However, it is to be appreciated that the present invention is applicable to the purification of oxygen from other sources and to the separation or purification of other gases.

Heretofore, oxygen has commonly been separated from atmospheric air by selective adsorption. Atmospheric air was cyclically pumped into one of a pair of beds filled with a physical separation material. The physical separation material, such as 5A Zeolite, permitted the less strongly adsorbed molecules such as oxygen and argon, to pass therethrough but trapped or retained the more strongly adsorbed molecules of nitrogen, carbon dioxide, and water vapor. When the trapping or adsorption capacity of the bed was substantially met, the air was pumped to the second bed while the first bed was evacuated or cleansed of the nitrogen and other molecules.

By carefully controlling the cycling of gas between the beds and other operating parameters, about 95% pure oxygen could be generated at the output to the beds. However, if too much flow is passed through the system during a cycle, the adsorption capacity of the beds will be exceeded and the purity of the product oxygen will become substantially less than the maximum purity limit of 95.7% or the normal 95% output of typical concentrators.

Oxygen composes about 20% of atmospheric air whereas argon composes about 1%. When nitrogen, carbon dioxide, and other larger molecules are removed from atmospheric air leaving substantially only oxygen and argon, the percentages of argon and oxygen in the separated gas increase about five fold. That is, even if the separator works perfectly, passing only oxygen and argon, the resultant product gas will be 4% to 5% argon and 95% to 96% oxygen. Thus, the purity of the resultant oxygen gas is limited by the argon content of atmospheric air. That is, the roughly 1% concentration of argon in the atmospheric air limits the purity of the separated oxygen to a maximum possible purity of about 95% or 96%.

In accordance with the present invention, a method and apparatus are provided for reducing the argon contamination of the separated oxygen and raise its purity.

SUMMARY OF THE INVENTION

In accordance with one aspect of the present invention, a method of producing super-enriched oxygen is provided. Oxygen and argon are physically separated from nitrogen, carbon dioxide, and water vapor. Thereafter, the oxygen/argon mixture is separated to produce super-enriched oxygen and argon.

In accordance with a more limited aspect of the invention, the oxygen and argon mixture is separated from atmospheric air by pumping the atmospheric air into one or more first beds containing a physical separation medium which passes mainly oxygen and argon therethrough while preferentially adsorbing other molecules including nitrogen, carbon dioxide, and water vapor. The gaseous mixture from the first bed is pumped into a second bed containing a second physical separation material which passes mainly nitrogen and argon therethrough while preferentially adsorbing oxygen. The adsorbed oxygen from the second bed is recovered to produce the super-enriched oxygen.

In accordance with another aspect of the present invention, an apparatus is provided for producing super-enriched oxygen. The apparatus includes a first bed which contains a first physical separation material that passes oxygen and argon gases therethrough while adsorbing at least nitrogen gas. A second bed which contains a second physical separation material which passes at least nitrogen and argon and which adsorbs oxygen is interconnected with the first bed to receive the oxygen-/argon mixture therefrom. The argon and nitrogen, if any, in the mixture pass through the second bed while substantially pure, super-enriched oxygen is adsorbed on the second physical separation material. A means is provided for recovering and discharging the adsorbed oxygen from the second bed.

The primary advantage of the present invention is that it produces super-enriched oxygen from atmospheric air, enriched beyond the capabilities of a conventional pressure swing adsorption concentrator.

Another advantage of the present invention resides in its simplicity. It is able to generate super-enriched oxygen with very little additional complexity or parts relative to the prior art pressure swing adsorption type oxygen concentrators.

Another advantage of the present invention resides in its cost effectivity. It is able to produce super-enriched oxygen at a minimal cost differential relative to the prior art oxygen separators which produced oxygen of lower purity.

Still further advantages will become apparent to those of ordinary skill in the art upon reading and understanding the following detailed description of the preferred embodiments.

BRIEF DESCRIPTION OF THE DRAWINGS

The invention may take form in various parts and arrangements of parts and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
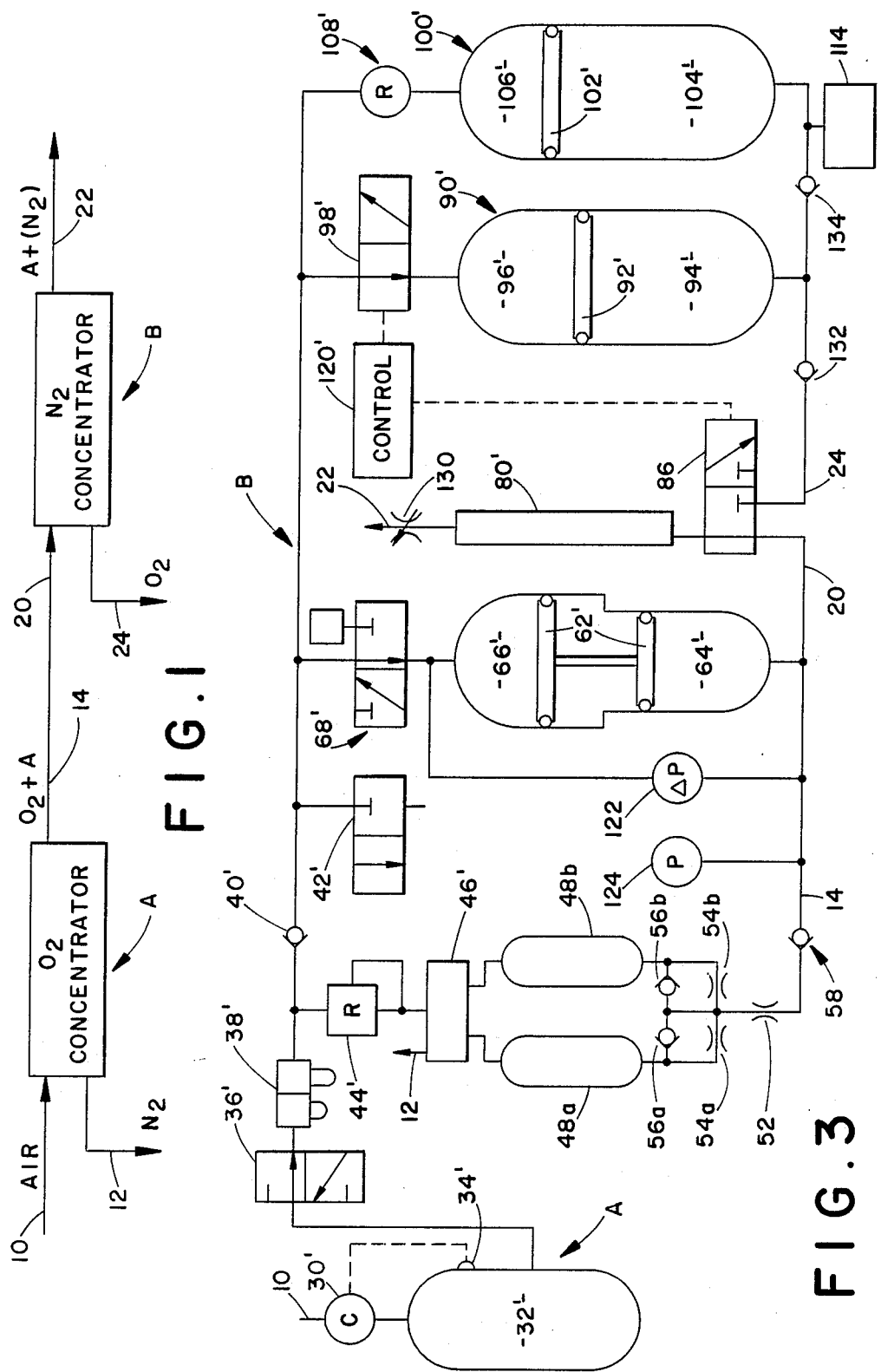
FIG. 1 is a diagrammatic illustration of a super-enriched oxygen production apparatus in accordance with the present invention.

With reference to FIG. 1, an oxygen concentrator A selectively separates oxygen and argon from nitrogen, carbon dioxide, and water vapor. Air is received at a first inlet 10 and at least the nitrogen is exhausted from the system through a first secondary gas outlet 12. The carbon dioxide and water vapor may be exhausted like the nitrogen or may be trapped, condensed, or removed by other means. An oxygen/argon mixture is passed through a first primary gas outlet 14.

An oxygen/argon mixture, which in some instances will have a small amount of nitrogen contamination, is fed from the primary gas output 14 of the oxygen concentrator to an input 20 of a nitrogen concentrator B. The nitrogen concentrator selectively passes gas rich in the argon and nitrogen, if any, through a secondary gas outlet 22 and passes oxygen depleted of argon and nitrogen through a final product gas outlet 24. It is to be appreciated that the apparatus of FIG. 1 may be adapted to separate another selected gaseous component or components from a gaseous mixture.

Figure 2:
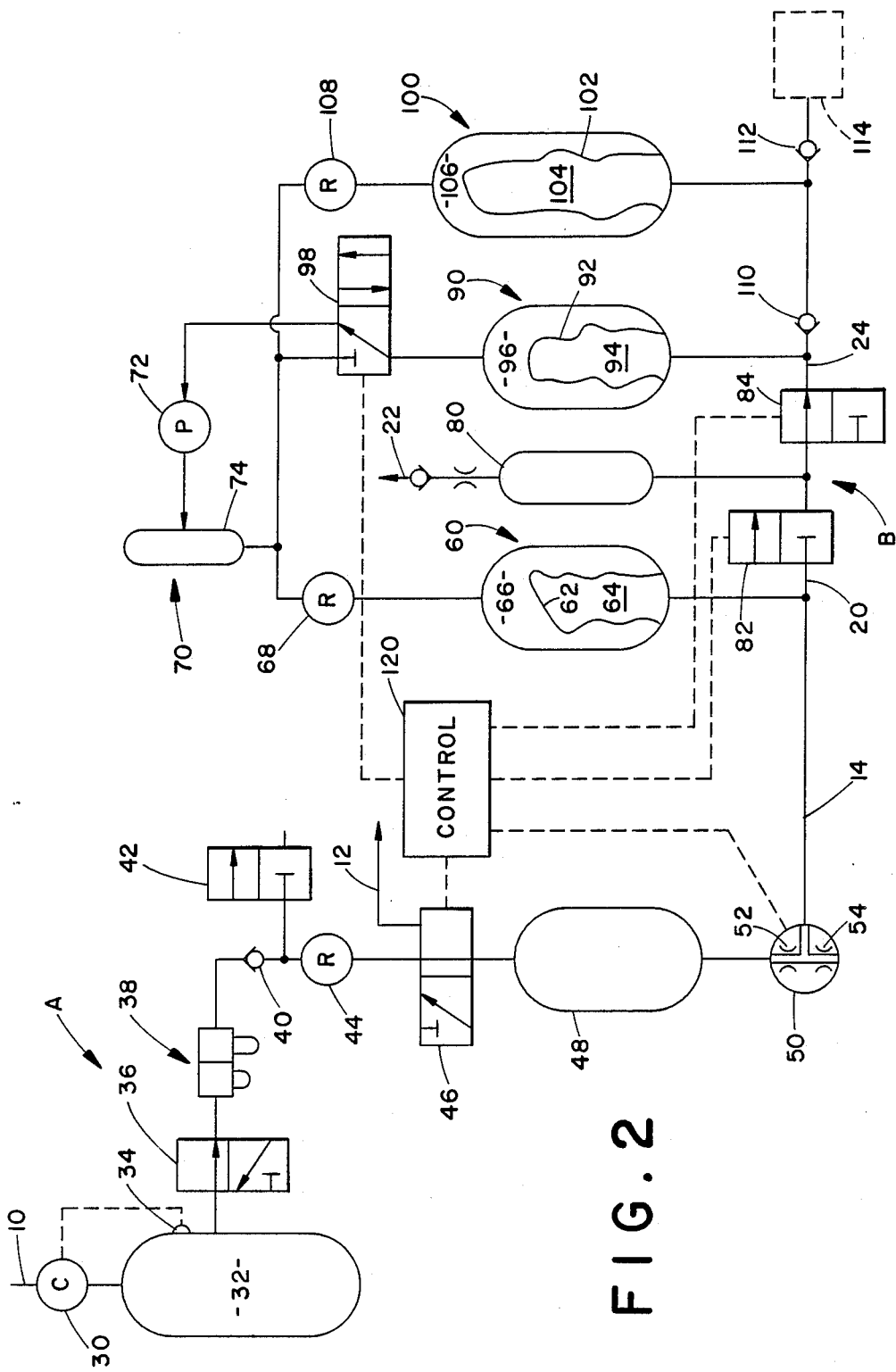
FIG. 2 is an alternate embodiment of a super-enriched gas separating means; and, FIG. 3 is yet another alternate embodiment in accordance with the present invention.

With reference to FIG. 2, in one preferred embodiment, the oxygen concentrator A includes a compressor 30 which maintains a preselected range of gas pressure in a reservoir 32. A pressure sensor 34 controls the compressor 30 in order to maintain a preselected pressure within the pressurized air reservoir 32. An on/off switch 36 permits the concentrator to work normally in one mode and evacuate the system to atmosphere in a second mode. A filter means 38 traps oils and water.

A check valve 40 limits the compressed air flow to a single direction. An emergency shut-off valve 42 is operable for selectively venting the downstream components of the oxygen separator to the atmosphere. A pressure regulator 44 limits the pressure of the compressed gas flowing into a cross over valve 46. In a first mode, the cross over valve directs the compressed air into a first bed or tank 48 containing a first physical separation material. The first physical separation material, such as a 5 angstrom (5A) zeolite, preferentially adsorbs nitrogen, as well as carbon dioxide, water vapor, yet preferentially passes oxygen, and argon molecules therethrough. More specifically, separation is accomplished by exposing the molecular sieve zeolite to higher pressure air. This disturbs the equilibrium of adsorbed gases and causes the capacity for adsorbing both nitrogen and oxygen to increase. However, in a 5A zeolite sieve, the capacity for nitrogen adsorption grows faster than the capacity for oxygen adsorption and so the nitrogen is preferentially adsorbed while an enriched oxygen stream passes through the bed along with essentially unadsorbed argon.

The separated oxygen and argon pass through an outlet valve 50 and product flow controlling restrictor 52 to the oxygen concentrator outlet 14. In its second mode, the cross over valve 46 connects the first bed or tank 48 with the first secondary gas outlet 12 to allow adsorbed nitrogen to be discharged from the first bed 48. To assist in flushing the nitrogen from the first bed, the outlet valve 50 is positioned such that a restrictor 54 is disposed between the oxygen outlet 14 and the first bed 48 to enable a small amount of oxygen to be returned into the first bed and flush the nitrogen therefrom. More specifically, when the pressure is reduced to the original value, the adsorption capacities are reduced, the gases desorb and are exhausted. The system recycles in a completely regenerative manner. Product gas is used to purge the bed for high purity throughout. The system can use either positive pressure or vacuum to cyclically shift or swing the adsorption capacities.

The discharged oxygen/argon mixture storage pressure increasing means includes an expansible oxygen/argon mixture reservoir 60 receives the oxygen and argon gases from the oxygen concentrator A. More specifically, the mixture receiving reservoir 60 is divided by a first movable barrier or divider 62 into an oxygen/argon mixture receiving region 64 and a first pressurizing fluid receiving region 66. In the embodiment, the movable barrier is a flexible bladder or bag. A pressure regulator 68 maintains the first pressurizing fluid receiving region at a pressure lower than that in bed 48 so that the oxygen/argon mixture can be received, but high enough so that this pressure functions as an urging means 70 for urging or pumping the mixture to the second bed. In the illustrated embodiment, the urging means includes a pump 72 which pumps air or other fluid into an accumulator 74. The accumulator is connected with the pressure regulator 68 for providing pressurizing fluid thereto. Alternately, the compressor 30 and the first accumulator 32 may be utilized as the source of fluid pressure.

The nitrogen/argon separator concentrator B includes a second bed or tank 80 filled with a second physical separation material, such as 4 angstrom (4A) zeolite, which adsorbs oxygen but which passes nitrogen and argon. The second bed receives the mixture at the second inlet 20 and passes the nitrogen and argon therethrough to the secondary gas outlet 22. A first two position valve 82 is interconnected between the second bed 80 and the mixture reservoir 60 to provide control of feed gas flow into the second bed. A second two position valve 84 is provided adjacent the nitrogen concentrator final product outlet 24 to provide control of output gas flow. Together, valves 82 and 84 control the pressurization and exhaust timing for the second bed 80. The process of the second stage B, which uses 4A synthetic zeolite molecular seive, also relies on pressure increasing the capacity for adsorbing both gases, but in this process the slightly different sizes of the zeolite molecules allow the oxygen molecule to be adsorbed at a higher initial rate than the nitrogen and argon. With proper timing, the oxygen is preferentially adsorbed while nitrogen and argon pass through the bed. When the pressure is reduced by closing inlet valve 82 and opening the outlet valve 84, the adsorption capacities are reduced. The oxygen desorbs and is captured. Product oxygen can be used to purge the bed 80 if high purity throughput is desired.

Preferably, but not necessarily, the second bed 80 and expansible mixture receiving region 64 are sized relative to the first bed 48 such that the mixture receiving region 64 holds the amount of oxygen and argon separated during one cycle by the first bed 48 and the second bed 80 adsorbs the amount of oxygen separated by the first bed 48 during the one cycle. The second bed is long and narrow with a diameter commensurate with the size of the inlet and exhaust tubing. Preferably, the tubing is about a fifth of second bed diameter. For ⅜ inch tubing, a 1½ inch diameter ×24 inch bed has been found to be satisfactory.

An enriched oxygen pressure increasing means or pump 90 receives the adsorbed oxygen from the second bed 80 and supplies it downstream. More specifically, the means 90 includes a second movable barrier or divider 92 which defines a super-enriched oxygen receiving region 94 on a first side thereof and a pressurizing fluid receiving region 96 on a second side thereof. A cyclically operated valve 98 alternately connects the second pressurizing fluid receiving region 96 with a source of vacuum, e.g. the inlet of air pump 72, and a source of greater pressure 70. When connected with the source of lesser pressure, vacuum, or mechanical means, the second divider 92 is moved to expand the enriched oxygen receiving region 94 drawing adsorbed oxygen from the second bed 80. When connected with a source of fluid under pressure, or mechanical means of moving barrier 92, oxygen in the expansible oxygen receiving region 94 is pumped to downstream equipment or a storage reservoir 100. Preferably, but not necessarily, expansible oxygen receiving region 94 is sized to receive the amount of oxygen adsorbable in the second bed 80 in one cycle.

The storage reservoir 100 includes a movable barrier or divider 102 which divides an interior thereof into an enriched oxygen storage region 104 and a pressurizing fluid receiving region 106. A pressure regulator 108 connects the pressurizing fluid receiving region 106 with the accumulator 74. The pressure regulator 108 or other suitable means causes the pressure in the reservoir 100 to be slightly lower than maximum pumping pressure of the pumping means 90 such that the oxygen can be pumped through a check valve 110 into the storage reservoir 100. The pressure regulator also maintains a constant enriched oxygen pressure through an outlet check valve 112 to downstream equipment 114.

A control means 120 controls the cyclic operation of the cross over valve 46, the oxygen concentrator outlet valve 50, and the cyclically operated valves 82, 84 and 98. In the illustrated embodiment, each cycle has two portions. During the first cycle portion, the control means 120 positions the cross over valve 46 such that compressed air is fed into the first bed 48. The outlet valve 50 is positioned such that the separated oxygen and argon are fed into the mixture receiving region 64. The pressure regulator 68 allows exhausted oxygen and argon to vent to the first pressurizing fluid receiving region 66 such that the oxygen and argon may be readily received. Also during the first time period, the cyclically operated valve 98 interconnects the second pressurizing fluid receiving region 96 with the source of vacuum or lesser pressure and the outlet 84 interconnects the second bed 80 to the oxygen receiving region 94 such that oxygen previously adsorbed in the second bed 80 is drawn into the enriched oxygen receiving region 94.

During the second portion of each cycle, the control means 120 causes the cross over valve 46 to vent the first bed 48 to atmosphere and the second valve 50 to allow a small amount of the oxygen/argon mixture to be fed back into the first bed 48 to flush the nitrogen and the like therefrom. The pressure regulator 68 maintains such pressure in the first pressurizing fluid receiving region 66 with the accumulator 74 to pump the oxygen-/argon mixture from the mixture receiving region 64 into the second bed 80 when the inlet valve 82 interconnects region 64 and bed 80. As the mixture is pumped into the second bed 80, the oxygen is adsorbed and argon and nitrogen, if any, pass through the exhaust outlet 22. Also during the second cycle portion, the second cyclically operated valve 98 connects the second pressurizing fluid receiving region 96 with the accumulator 74 such that previously received enriched oxygen is pumped from enriched oxygen receiving region 94 into the storage reservoir 100.

The storage reservoir 100 supplies enriched oxygen continuously through both the first and second portions of each cycle to the downstream equipment 114. Other operating cycles are, of course, contemplated. For example, the oxygen/argon receiving region reservoir 64 may be sized to receive the mixture for several cycles of the valves 46 and 50 before supplying the argon/oxygen mixture to the second bed 80.

In the embodiment of FIG. 3, like elements with the embodiment of FIG. 2 are denoted with the same reference numerals but followed by a prime ('). Air under pressure is fed from an accumulator 32' to a cross over valve 46'. The cross over valve alternately feeds the pressurized air to one of a pair of first beds 48a, 48b while exhausting nitrogen from the other bed through the secondary gas outlet 12. The oxygen and argon mixture pass through one of check valves 56a and 56b restrictor 52' and check valve 58 to the oxygen/argon mixture outlet 14. A portion of the oxygen and argon flows through restrictors 54a or 54b to purge the bed that is exhausting. The oxygen and argon mixture is received substantially continuously in an oxygen/argon mixture receiving region 64' until a sensor 122 senses that the reservoir has been filled. In the illustrated embodiment, the sensor 122 is a differential pressure sensor that senses when the pressure in the mixture receiving region 64' exceeds the atmospheric pressure in a first pressurizing fluid receiving region 66' by a preselected amount. Upon sensing that the mixture receiving region is filled, the sensing means 122 causes a first cyclically operated valve 68' to supply compressed air from the accumulator 32' into the pressurizing fluid receiving region 66' displacing a divider 62' and pumping the oxygen and argon mixture to the nitrogen separator means B. A high pressure sensing means 124 may be used to disable the oxygen concentrator, particularly the cross over valve 46', when the pressure at the oxygen/argon mixture outlet 14 exceeds a preselected maximum pressure. This disables the oxygen concentrator while the oxygen and argon mixture is being fed to the nitrogen separator.

A control means 120' causes a control valve 86 to allow the pressurized oxygen/argon mixture to pass into a second bed 80' of the second physical separation material for a preselected duration. A restrictor valve 130 allows a small fraction of gas to escape from the second bed through the secondary gas outlet 22. After the preselected duration, the control means 120' causes the inlet-outlet valve 86 to interconnect the second bed with downstream equipment 90', 100' and 114 through check valves 132 and 134. Because the oxygen is adsorbed while the argon and nitrogen pass therethrough, gas disproportionately rich in argon and nitrogen passes through the restrictor valve 130 rendering gas remaining in bed 80' depleted in argon, or conversely enriched in oxygen. After the adsorption capacity of the second bed 80' is substantially met, the control means 120' reverses the position of inlet-outlet valve 86 and may close restrictor valve 130. The adsorbed oxygen then passes to the downstream equipment 114, a storage reservoir 100', or a pressure increasing means 90'.

In the illustrated embodiment, the substantially pure oxygen is received in an enriched oxygen pressure increasing means 90'. Periodically, a second control valve 98' introduces compressed air from the reservoir 32' into a pressurizing fluid receiving region 96' to pump the enriched oxygen into an oxygen storage reservoir 100'. Check valves 132 and 134 ensure unidirectional flow toward storage 104' and downstream equipment 114.

The invention has been described with reference to the preferred embodiments. Obviously, modifications and alterations will occur to others upon reading and understanding the preceeding detailed description. It is

Having thus described the preferred embodiment, the invention is now claimed to be:

1. A method of supplying super-enriched gas, the method comprising:
   compressing air through a single air compressor to provide a compressed air supply;
   separating a mixture of oxygen and argon from the compressed air supply with motive power derived from the compressed air supply and discharging the oxygen/argon mixture at a relatively low pressure;
   separating super-enriched oxygen from the oxygen/argon mixture with motive power derived from the compressed air supply and discharging the separated super-enriched oxygen at a lower pressure such that two separation stages are powered by the compressed air supply;
   increasing the lower pressure super-enriched oxygen to a relatively high pressure with motive derived power from the compressed air supply, whereby super-enriched oxygen is separated from air and supplied at high pressure with only motive power from a single compressor.

2. A method of supplying super-enriched oxygen, the method comprising:
   cyclically separating an oxygen/argon mixture from an air with a first cycle periodicity;
   cyclically separating super-enriched oxygen from the oxygen/argon mixture with a second cycle periodicity that is different from the first cycle periodicity.

3. The method as set forth in claim 2 wherein the second cycle periodicity is asynchronously related to the first cycle periodicity such that the oxygen separating step cycles independently of the oxygen/argon mixture separating step.

4. A method of supplying super-enriched oxygen, the method comprising:
   cyclically separating an oxygen/argon mixture from atmospheric air by cyclically with a first cycle periodicity passing the atmospheric air through an oxygen/nitrogen separating means for separating the oxygen/argon mixture from atmospheric air, the oxygen/nitrogen separating means including:
      an adsorbent bed which selectively passes oxygen and argon and adsorbs nitrogen;
      an oxygen/nitrogen separator valve means for cyclically supplying compressed air to the oxygen/nitrogen adsorbent bed and discharging nitrogen from the adsorbent bed with the first cycle periodicity; and
   cyclically separating super-enriched oxygen from the oxygen/argon mixture by cyclically with a second cycle periodicity passing the oxygen/argon mixture through an argon/oxygen separating means for separating the super-enriched oxygen from the oxygen/argon mixture, the oxygen/argon separating means including:
      an oxygen/argon adsorption bed for selectively adsorbing oxygen and passing argon therethrough;
      an oxygen/argon valve means for cyclically connecting the oxygen/argon adsorption bed with the oxygen/nitrogen separating means for receiving an oxygen/argon mixture therefrom and with a downstream oxygen receiving means for discharging oxygen thereto with the second cycle periodicity;
   the second cycle periodicity being different from the first cycle periodicity such that the oxygen/argon separator valve means cycle asynchronously relative to the cycling of the oxygen/nitrogen separator valve means.

5. A method of separating and supplying super-enriched oxygen, the method comprising:
   compressing atmospheric air;
   separating an oxygen/argon mixture from the compressed atmospheric air at a positive pressure;
   passing the oxygen/argon mixture through an adsorbent bed including an adsorbent material which selectively adsorbs oxygen and passes argon;
   cyclically drawing the oxygen from the adsorbent bed at a subatmospheric pressure;
   increasing the oxygen pressure to a super atmospheric pressure and passing the oxygen downstream at the super atmospheric pressure.

6. An oxygen enriching system for use in combination with and which derives all its motive power from an oxygen separator system that includes a compressor means for providing compressed air and an oxygen/nitrogen separating means for separating a mixture of oxygen and argon from the compressed air, the oxygen/nitrogen separating means being operatively connected with the compressor means to receive the compressed air therefrom, the oxygen/nitrogen separating means discharging the oxygen/argon mixture at a relatively low pressure, the oxygen enriching system comprising:
   a first pressurizing means for increasing the pressure of the oxygen/argon mixture to a relatively high pressure;
   a means for connecting the first pressurizing means with said compressor means for receiving the compressed air therefrom such that the first pressurizing means derives its motive power from the oxygen separator system compressor means to increase the pressure of the oxygen/argon mixture to the relatively high pressure;
   an oxygen/argon separating means for separating super-enriched oxygen from argon and discharging the super-enriched oxygen at a lower pressure, the oxygen/argon separating means being connected with the first pressurizing means for receiving the oxygen/argon mixture at the relatively high pressure therefrom such that the oxygen separator compressor means provides motive power for both the oxygen/nitrogen separating means and the oxygen/argon separating means.

7. The system as set forth in claim 6 wherein the oxygen enriching system further includes:
   a second pressurizing means for increasing the pressure of the super-enriched oxygen, the second pressurizing means being connected with the oxygen/argon separating means for receiving the discharged super-enriched oxygen therefrom and increasing its pressure;
   a means for connecting the second pressurizing means with the oxygen separation system compressor means for receiving the compressed air therefrom such that the second pressurizing means derives its motive power from the compressed air for increasing the pressure of the separated oxygen;

such that the compressor means provides motive power to increase the pressure of the separated super-enriched oxygen as well as for both the oxygen/nitrogen separating means and the oxygen/argon separating means.

8. The system as set forth in claim 7 wherein the oxygen argon separating means includes:
an adsorption bed which is operable to pass argon while adsorbing oxygen; and,
a valve means for passing the argon/oxygen mixture from the first pressurizing means to the adsorbing bed in a first mode and for passing oxygen from the adsorbing bed to the second pressurizing means in a second mode, the valve means being cyclically operable between its first and second modes.

9. The system as set forth in claim 8 wherein the adsorbing bed includes 4A zeolite which initially adsorbs argon and which subsequently displaces the adsorbed argon and as it adsorbs oxygen.

10. The system as set forth in claim 9 further including a valve control means for holding the valve means in the first mode until oxygen displaces the adsorbed argon.

11. The system as set forth in claim 6:
wherein the oxygen/nitrogen separating means includes a oxygen/nitrogen valve for cyclically supplying the compressed air to at least one oxygen/nitrogen adsorption bed in a first mode and discharging separated nitrogen from the oxygen/nitrogen adsorption bed in a second mode and an oxygen/nitrogen valve control means for selectively cycling the oxygen/nitrogen valve means between its first and second modes; and,
wherein the oxygen/argon separating means further includes an oxygen/argon valve for cyclically passing the oxygen/argon mixture from the first pressurizing mans to an oxygen/argon adsorbing bed in a first mode and for passing super-enriched oxygen down stream in a second mode and an oxygen/argon valve control means for selectively cycling the oxygen/argon valve means between its first and second modes, the oxygen/nitrogen valve control means and the oxygen/argon valve control means cycling the respective valves asynchronously of each other, such that cycling of the oxygen/argon separating means is independent of cycling of the oxygen/nitrogen separating means.

12. An apparatus for supplying super-enriched oxygen, the apparatus comprising:
an oxygen/nitrogen separating means for separating an oxygen/argon mixture from atmospheric air, the oxygen/nitrogen means including:
an adsorbent bed which selectively passes a mixture of oxygen and argon and which selectively adsorbs nitrogen;
an oxygen/nitrogen valve means for supplying compressed air to the oxygen/nitrogen adsorption bed in a first mode and for discharging nitrogen from the adsorption bed in a second mode;
an oxygen/argon separating means for separating oxygen from the oxygen/argon mixture, the oxygen/argon separating means including:
an oxygen/argon adsorption bed for selectively adsorbing oxygen and passing argon therethrough;
an oxygen/argon valve means for connecting the oxygen/argon adsorption bed with the oxygen/nitrogen separating means in a first mode for receiving an oxygen/argon mixture therefrom and for connecting the oxygen/argon adsorption bed with downstream oxygen receiving means in a second mode for discharging oxygen thereto; and,
a valve control means for asynchronously cycling the oxygen/nitrogen and oxygen/argon valve means between their first and second modes such that each valve means cycles independently of and in no fixed relationship to the other valve means.

13. A super-enriched oxygen separating system comprising:
an air compressing means for compressing atmospheric air;
an oxygen/nitrogen separating means for separating an oxygen/argon mixture from the compressed atmospheric air;
an oxygen/argon adsorbent bed;
an oxygen/argon valve means which is operable in a first mode for passing the oxygen/argon mixture from the oxygen/nitrogen separating means to the oxygen/argon adsorbent bed and which is operable in a second mode for passing super-enriched oxygen from the adsorbent bed downstream;
a pressurizing means for cyclically drawing a subatmospheric pressure and creating a super atmospheric pressure, the pressurizing means being connected with the oxygen/argon valve means for drawing the oxygen from the oxygen/argon adsorbent bed at the subatmospheric pressure and for discharging the oxygen downstream at the super atmospheric pressure; and,
an oxygen storage reservoir operatively connected with the pressurizing means for receiving and storing oxygen therefrom at the super atmospheric pressure.

14. The system as set forth in claim 13 wherein the oxygen/nitrogen separating means includes an oxygen/nitrogen valve means for cyclically supplying the compressed air to an oxygen/nitrogen separation bed and for discharging nitrogen from the separation bed to the atmosphere; and,
further including a control means for controlling the oxygen/argon valve means and the oxygen/nitrogen valve means such that the oxygen/argon valve means and the oxygen/nitrogen valve means are cycled asynchronously.

* * * * *